Aug. 22, 1944.                F. C. SIMONDS                2,356,279
                               PELICAN HOOK
                           Filed Aug. 21, 1942

Attest
John G. Butz
Andrew T. Zodl

Inventor
Frank C. Simonds
By Norbert E. Birch
Attorney

Patented Aug. 22, 1944

2,356,279

UNITED STATES PATENT OFFICE 2,356,279

PELICAN HOOK

Frank C. Simonds, Moylan, Pa., assignor to The Atlantic Refining Company, Philadelphia, Pa., a corporation of Pennsylvania Application August 21, 1942, Serial No. 455,682

4 Claims. (Cl. 294—83)

The present invention relates to a device for supporting and releasing loads, and more particularly for securing and releasing life rafts, life boats, life nets, anchors, mooring lines, and the like.

The device of the present invention is essentially an improved pelican hook which can be employed in any situation where it is desirable to have a quick-acting, clean-cut release in a line or cable which may or may not be under strain. The device is especially adapted for securing and releasing life rafts or life boats under conditions in which time is of prime importance, for example, in the abandonment of a foundering ship. Among the outstanding features of the device is the actuation thereof by remote control, and the fact that the device cannot be actuated accidentally by the wash of the sea, or wind, or other uncontrollable elements.

Reference is made to the drawing in which like characters of reference are used to designate similar elements.

Figure 1:
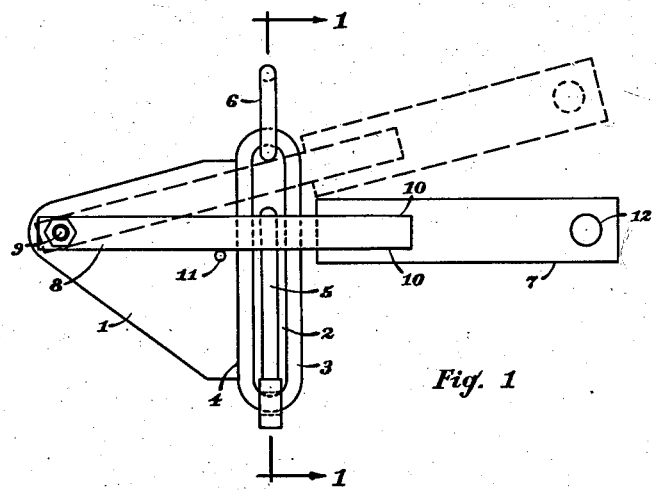
Figure 1 is a side elevational view illustrating a device constructed in accordance with the present invention in which the releasing means is shown in full lines in load supporting position and in dotted lines in load releasing position.
Figure 2:
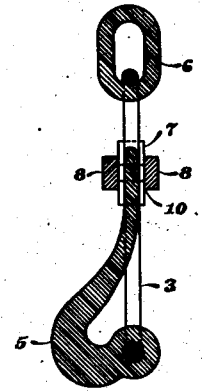
Figure 2 is a side sectional view taken on line 1—1 of Figure 1.

Referring to the drawing, 1 represents a body member provided with an elongated aperture or slot 2 adjacent one extremity of the body member. The body member may be fabricated from steel plate and may take the shape of a triangle, although other shapes may be employed if desired. The elongated aperture or slot 2 may be formed by welding an elongated link 3, for example, to the edge of the body member along the line 4, or the aperture may be cut or milled directly out of the body member. The former method is preferred, since the elongated link 3 will be stronger and better able to take the strain of a load. An L-shaped hook 5, preferably a pelican hook, is pivoted at the lower end of the elongated aperture 2 upon link 3, and is rotatable in a plane perpendicular to body member 1. A short link 6 may be provided at the upper end of the elongated link 3 for suspending the body member 1. Link 6 may be connected with a line or cable capable of sustaining a load imposed upon hook 5, or if desired the link 6 may be dispensed with, and the supporting line or cable may be attached directly to the upper end of the elongated link 3. A lever 7 having a forked arm 8 is pivoted upon a bolt 9 adjacent the opposite extremity of body member 1, the forked arm 8 encompassing the body member 1 and being capable of limited rotation upon bolt 9 in a plane parallel to that of the body member 1. The lever 7 may comprise a steel bar of rectangular cross-section, upon either side of which is attached a smaller bar, for example, by welding at 10, thus forming a forked arm 8. The forked arm 8, when in a lowered or operative position, retains the upper or free end of hook 5 within the elongated aperture or slot 2, thus locking the hook in closed position. The bolt 9 upon which the forked arm 8 is pivoted may be provided with suitable bushings on each side of body member 1 to center the body member with respect to the forked arm, and to permit free movement of the forked arm upon the pivot. The lever 7 is preferably made relatively heavier than the arm 8, in order that such lever may not be readily displaced by accident. The body member 1 is provided with a stop 11 extending perpendicularly from either side of the body member, such stop being capable of preventing the forked arm 8 from descending so far as to bind upon the hook 5. The stop may be constructed by drilling a hole through the body member 1, inserting a short length of bar steel, and welding the bar on each side of the body member 1. The lever 7 may be provided with an aperture 12 or other suitable means, by which a lanyard may be attached for the purpose of actuating the lever 7.

By way of example, the operation of the device in connection with the supporting and release of a ship's life raft is accomplished as follows:

The life raft is held upon an inclined chute of conventional design, the raft being retained by a catch or trigger at the bottom edge of the chute. The catch, in turn, is connected by means of a line to the hook 5 of the present device, such device being suspended from the ship's superstructure by means of a line or cable attached to short link 6. The hook 5 is locked in closed position by means of lever 7, the open end of the hook being retained in the elongated aperture 2 between the forked arm 8. A lanyard attached to lever 7 through aperture 12 is carried upward through a pulley on the ship's superstructure above the present device, and the lanyard may be extended to any desired position in the general vicinity of the life raft. At such time as it is desired to release the life raft, the lanyard is pulled, thus causing the lever 7 to be lifted sufficiently for the forked arm 8 to clear the top of the free end of hook 5 in the manner shown in dotted lines in Figure 1 of the drawing, whereupon the hook is released and tension upon the line connecting the hook and the trigger of the life raft chute is relieved. The trigger is thus released, and the life raft is free to slip down the chute into the sea.

While the device of the present invention is particularly adapted for use in connection with life rafts, life boats, and the like, it may also be employed in any situation where it is desirable to have a positive and clean-cut release in a line or cable which may or may not be under load.

I claim:

1. A device for supporting and releasing loads, comprising a triangular body member, an elongated aperture adjacent one edge of said body member, an L-shaped hook pivoted at the lower end of said aperture and rotatable in a plane perpendicular to said body member, a link associated with the upper end of said aperture for suspending said body member, a lever having a forked arm pivoted adjacent the edge of said body member opposite the elongated aperture of said body member, the forked arm of said lever encompassing said body member and adapted to maintain the free end of said L-shaped hook within said elongated aperture, means associated with said lever for displacing said lever in the plane of said body member to release the end of said hook, and a stop affixed to said body member to prevent the forked arm of said lever from binding upon said L-shaped hook.

2. A device for supporting and releasing loads comprising a body member, an elongated aperture adjacent one edge of said body member, a hook pivoted at the lower end of said aperture and rotatable in a plane perpendicular to said body member, means associated with the upper end of said aperture for suspending said body member, a lever having a forked arm pivoted adjacent the edge of said body member opposite the elongated aperture of said body member, the forked arm of said lever encompassing said body member and adapted to maintain the free end of said hook within said elongated aperture, means associated with said lever for displacing said lever in the plane of said body member to release the end of said hook, and means associated with said body member to prevent the forked arm of said lever from binding upon said hook.

3. A device for supporting and releasing loads comprising a body member, an elongated aperture adjacent one extremity of said body member, a hook pivoted at the lower end of said aperture and rotatable in a plane perpendicular to said body member, a lever having a forked arm pivoted on said body member, the forked arm of said lever encompassing said aperture and adapted to maintain the free end of said hook therewithin, and means associated with said lever for displacing said lever in the plane of said body member to release the end of said hook.

4. A device for supporting and releasing loads, comprising an elongated body member, a hook pivoted adjacent one end edge of the body member and rotatable in a plane perpendicular to said body member, a lever having a forked arm pivoted on said body member and adjacent the opposite end edge thereof, the parallel members of the forked arm of said lever being adapted to maintain the free end of said hook in load supporting position, and means operatively associated with said lever for displacing said lever to release the free end of said hook.

FRANK C. SIMONDS.